United States Patent [19]
Maeda et al.

[11] Patent Number: 4,511,929
[45] Date of Patent: Apr. 16, 1985

[54] PICTURE IMAGE INFORMATION RECORDING APPARATUS

[75] Inventors: Masatoshi Maeda, Kawasaki; Junji Katsurai, Hachioji; Hiroaki Ikeda, Tachikawa, all of Japan

[73] Assignee: Konishiroku Photo Industry Co. Ltd., Tokyo, Japan

[21] Appl. No.: 372,225

[22] Filed: Apr. 26, 1982

[30] Foreign Application Priority Data

Apr. 29, 1981 [JP] Japan .................................. 56-65447

[51] Int. Cl.³ .............................................. H04N 5/76
[52] U.S. Cl. ..................................... 358/296; 358/335
[58] Field of Search ................ 360/33.1; 358/296, 302, 358/335, 345, 347, 244, 244.1, 81, 82, 83, 87, 104, 108, 109, 22, 183, 77, 78, 256, 280, 293

[56] References Cited
U.S. PATENT DOCUMENTS 4,130,834 12/1978 Mender et al. ....................... 358/302
4,295,154 10/1981 Hata et al. ........................... 360/33.1
4,360,805 11/1982 Andrews et al. .................... 358/244
4,393,410 7/1983 Ridge et al. ......................... 358/293
4,395,236 7/1983 Gotthold ............................. 358/335

OTHER PUBLICATIONS

Patten, "The Digital Video Effects (DVE) System", SMPTE Journal, vol. 87, Apr. 1978, pp. 214-218.

Primary Examiner—Donald McElheny, Jr.
Attorney, Agent, or Firm—Jordan B. Bierman

[57] ABSTRACT

A picture image recording apparatus in which a picture image information input device such as a scanning type television camera, a device for binary coding the picture image information, a memory device for storing the binary-coded picture image information, a monitor device such as a CRT display for displaying the binary-coded picture image information, and a hard copy device such as an electrophotographic copy machine for producing a hard copy of the binary-coded picture image information are combined so that a picture image on a relatively large plane can be recorded economically with high resolution. The large plane to be recorded is divided into a plurality of frames, and the picture information for the frames is stored in memory and made to align so that they can be combined together in a high resolution hard copy output.

5 Claims, 10 Drawing Figures

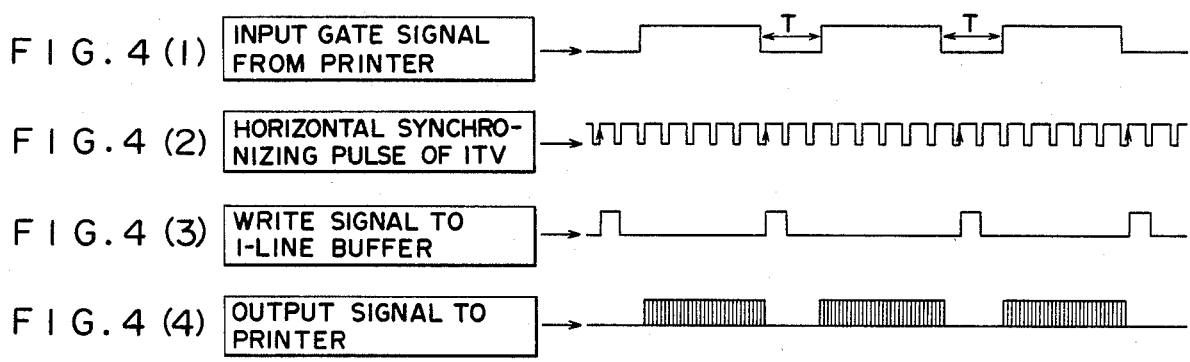
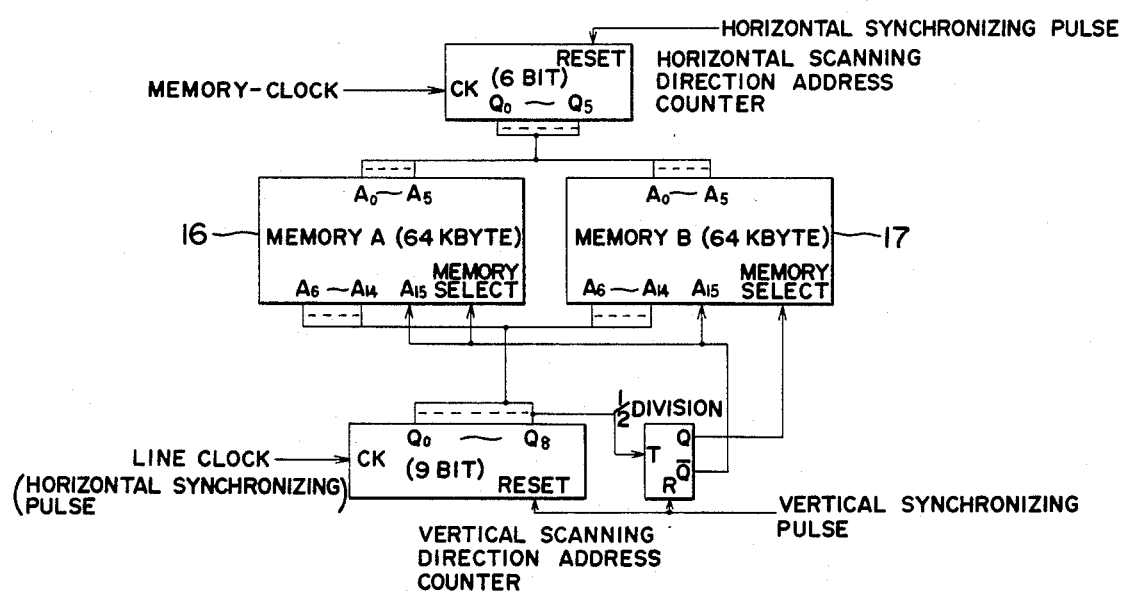

FIG. 6-I
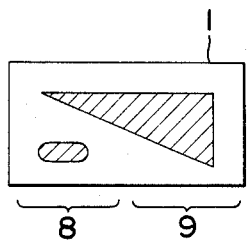
FIG. 6-II
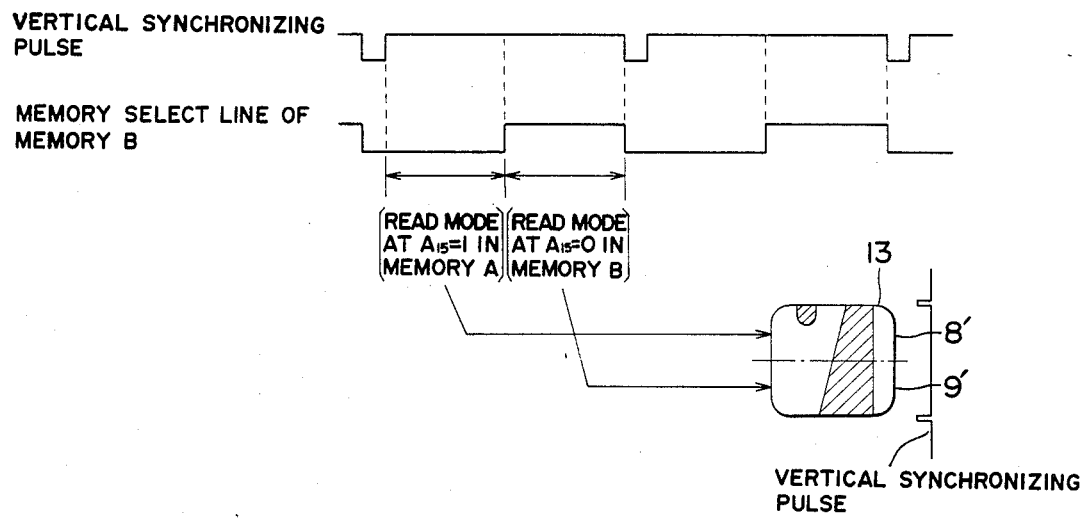

PICTURE IMAGE INFORMATION RECORDING APPARATUS

BACKGROUND OF THE INVENTION

Field of the Invention

This invention relates to a picture image information recording apparatus, and more specifically to a picture image information recording apparatus suitable for recording a picture image on a relatively large plane such as a picture image on a blackboard.

SUMMARY OF THE INVENTION

The present invention is directed to provide an apparatus for obtaining clear recorded material with high resolution by the use of a novel method, though the apparatus itself comprises a combination of known techniques such as a known television camera with a known printer, and is economical to produce.

Other objects and features of the present invention will become more apparent from the following description taken in conjunction with the accompanying drawings.

BRIEF DESCRIPTION OF THE DRAWINGS

FIGS. 4(1) through 4(4) are diagrams showing the reading and writing method of signals when a dynamic RAM is used as an example of the method of storing picture image information, in which:

FIG. 4(1) shows a time chart of an input gate signal from a printer;

FIG. 4(2) shows a time chart of a horizontal synchronizing pulse of an ITV;

FIG. 4(3) shows a time chart of a write signal to a 1-line buffer; and

FIG. 4(4) shows a time chart of an output signal to the printer;

FIG. 5 is a block diagram showing a part of the construction of the memory means of the picture image recording apparatus of the present invention; and FIGS. 6-I and 6-II show the picture images on the blackboard and on the CRT in adjusting the boundary portion of the picture images of the two frames for the picture synthesis, when the picture image on the blackboard is divided into two frames and is input, FIG. 6-II also simply shows the state of the read signal in the memory means.

DESCRIPTION OF THE PREFERRED EMBODIMENTS

Figure 1:
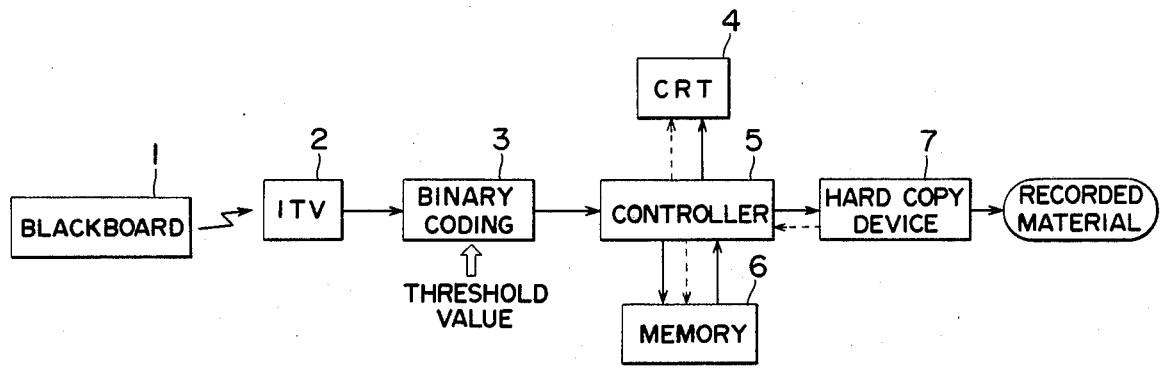
FIG. 1 is a block diagram showing the arrangement of the constituents of a picture image information recording apparatus in accordance with an embodiment of the present invention.

Hereinafter, an embodiment of the present invention will be described with reference to FIG. 1.

This embodiment illustrates a so-called "blackboard copier" for obtaining a permanent picture image from a picture image on a blackboard in the following manner.

The picture image on the blackboard 1 is first photographed by an industrial television camera (hereinafter referred to as the "ITV") 2 and the picture image information signal (represented by solid line with arrow in the drawing) produced by the ITV 2 is applied to a binary coding circuit 3. The threshold value is adjusted in order to remove stains on the blackboard or non-uniform illumination and the resulting binary coded picture image information signal which can be discriminated is applied to a controller 5 of a subsequent stage. The controller 5 applies the binary coded picture image information signal to a CRT display (hereinafter referred to as the "CRT") 4 for display and to monitor it, and exchanges it with a memory device 6. After adjustment, the binary coded picture image information signal of the entire blackboard is applied to a hard copy device 7 to obtain the permanent picture image. An electro-photographic recording device using an OFT printer, a line printer, an ink jet printer or the like can be used as the hard copy device 7.

Pictures, such as characters or figures written or drawn in chalk on a blackboard, have often been made into binary-coded signals, but to date a recording apparatus for such picture images that does not need tone gradiations is virtually undeveloped. Though such a recording apparatus has high potential utility, none has been developed mainly because the apparatus must have a certain level of resolution of the picture image to be able to discriminate the chalk lines so that a high resolution television camera must be used. Thus, the apparatus becomes considerably expensive for a blackboard copier. In other words, no method has been developed so far which makes it possible to obtain practically sufficient resolution without making the construction of the apparatus complicated.

The present invention is directed to obtain a hard copy of a picture image having a relatively large plane area such as that of the blackboard. The present invention makes use of a relatively economical and easy-to-use industrial television camera ITV and compensates for its low resolution by dividing the blackboard into a plurality of frames such as into two frames so as to improve the resolution.

More concretely, an ordinary blackboard has a size of about 180 cm × 90 cm. If the picture image is used as an input for an ordinary low-cost ITV, the resolution is only about 2 to 5 mm on the blackboard so that the picture image information of the chalk can not be discriminated. The resolution of the ITV is generally 525 scanning lines in the vertical direction and 400 to 600 lines in the horizontal direction, and the number of scanning lines can be easily increased only by changing the frequency of the vertical synchronizing signal. If the vertical synchronizing signal is changed from the ordinary 60 Hz to 30 Hz, it doubles the number of scanning lines and the resolution on the blackboard is improved as much.

In the picture image information recording apparatus in accordance with this embodiment of the present invention, the number of scanning lines on the effective picture surface is 850 lines. The resolution of the picture surface information can be further improved if the blackboard is divided into a plurality of frames and photographed by the ITV as several frames.

When the picture surface of the blackboard 1 is divided into two frames (left frame 8 and right frame 9) when obtaining the picture image information, the picture surface ratio of the ITV 2 can be changed by turning the ITV. In the ordinary direction of the ITV 2, the picture surface ratio of the ITV is 4:3 between the direction 11 of the horizontal scanning lines and the direction 10 of the vertical scanning lines. If the ITV 2 is rotated by 90 degrees, for example, the width-to-length ratio of the left frame, for example, becomes 3:4 and the width-to-length ratio of the entire picture image input region 12 of the two frames becomes 3:2 which is close to the width-to-length ratio 2:1 of the shape of the blackboard 1, thereby improving the effective picture surface efficiency. As a result, in addition to the improvement in the resolution of the ITV itself brought forth by increasing the number of scanning lines by about 60%, the picture surface synthesis of the two frames practically provides the resolution of about 1700 lines in the transverse direction and about 450 lines in the longitudinal direction. This means the resolution of approximately 1×2 mm on the blackboard which improves the resolution up to a practical range.

Figure 3:
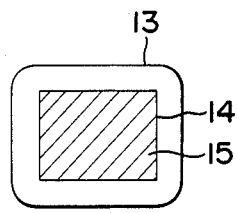
FIG. 3 is a schematic view showing the effective recording range displayed on the CRT picture surface of a CRT display as one of the constituents of the present apparatus, in which range a hard copy can be obtained.

If the resolution is improved in the abovementioned manner, the seam portion between the frames (or each divided picture image) must be aligned. For this purpose a monitor such as a CRT or the like is required for easily visualizing the picture image signal as one of the constituents of this binary coding recording apparatus. Besides processing the seams between the plurality of frames, the monitor using the CRT makes it possible to judge whether or not the desired picture image portion to be recorded falls within the effective recording range 15 indicated by oblique lines in FIG. 3. The range which permits the hard copy to be made (or the effective recording range) is indicated by the boundary lines 14 inside the CRT picture surface 13 as shown in FIG. 3. Hence, the monitor is used for aiming the picture image information input apparatus of the present invention.

The boundary line portion 14 can be displayed in response to the recording range of the hard copy device 7 included in the apparatus of the present invention by setting the address inside the memory device 6 corresponding to the boundary lines 14 (FIG. 3) displaying the effective recording range 15 and by storing the recording range information signal from the hard copy device 7, indicated by broken line with arrow in FIG. 1, in the address of the memory device. The recording range information signal is produced in response to signals representing the size of the paper used in the hard copy device, the diminishing or expanding ratio, and the like.

As described already, the threshold value is adjusted in accordance with the illumination of the blackboard or the like to obtain a better picture image for binary-coding the picture image information signal from the ITV. In this case, the CRT is also used to confirm the binary coded picture image of the binary coded picture image information signal output that varies with the adjustment of the threshold value.

Figure 2:
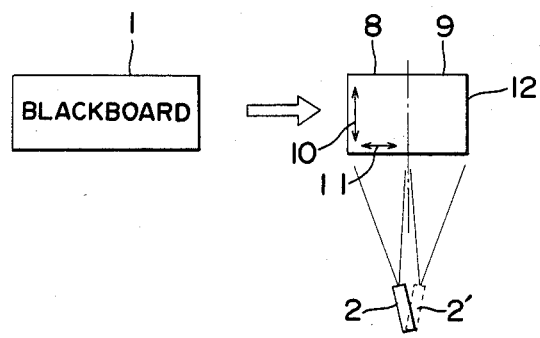
FIG. 2 is a schematic view showing a concrete method of dividing the surface of a blackboard into two portions using an industrial television camera for practising the present invention.

The line between the frames can be aligned in the following manner. If the picture image of the blackboard is halved, for example, the left half is displayed on the entire surface of the CRT, processed by the binary coding circuit, and then stored in a first memory means such as a dynamic random access memory. The picture image of the right half, is read by the ITV 2' aimed as shown in FIG. 2, and stored in a second memory means. Thereafter, while only the boundary portions of the picture images of the left and right halves of the blackboard are displayed on the upper and lower parts of the CRT surface from both memory means, the right frame side is moved by adjusting the direction of the ITV to align the same portion.

If a dynamic RAM (hereinafter referred to as "D-RAM") is used as the image memory requiring a relatively large capacity as an example of the memory means, the cost can be reduced and the actual installation density can be improved. Explanation will be made with reference to FIG. 4. If the D-RAM is used, the refresh cycle must be done accurately. In the apparatus in accordance with the present invention, the row address count of the D-RAM is allocated to the first through fourth horizontal synchronizing signal pulses in order to keep the D-RAM in the read mode and to have it refresh, thus enabling the display on the ordinary monitor television. The timing of writing onto the D-RAM is the same as the timing of the read mode, but when an output to a 1-line dot printer (such as an OFT printer, a laser printer or the like) having a period slower than the period of the horizontal scanning line is to be produced, the delivery clock to the printer must be changed. Accordingly, a static memory is used as the 1-line buffer memory and writing from the image memory to the 1-line buffer memory is made with the read timing corresponding to one pulse of the horizontal synchronizing signal on the ITV during a blank period of the input gate signal of the printer, which blank period is at least 2H period (the period of two horizontal synchronizing signals indicated by T in the drawing). Thus, timing of the refresh cycle of the D-RAM can be kept in order.

In photographing a picture image on the blackboard with the ITV, the picture image signals are applied to the memory devices through the binary coding circuit and then the seam portions of the left and right picture images of the blackboard are aligned in the abovementioned manner wherein the picture image regions at the boundary between the frames to be aligned are displayed and adjusted. If the blackboard is divided into two frames to produce the picture image information signals as described above, the blackboard picture image information inside the left frame 8 is first stored in the first memory means and the blackboard picture image information inside the right frame 9 is stored in the second memory means at the position of the ITV 2' (represented by broken lines) in FIG. 2. At the same time, while it is being displayed at the lower part of the CRT picture surface as shown in FIG. 6-II, only the picture image portion close to the boundary of the picture image information of the left frame 8 stored in the memory (the picture image at the upper part of the CRT picture surface) and the boundary portion between both frames (the seam of the picture images indicated by dot-and-dash line in FIG. 2) are adjusted to that picture image information of whole blackboard can be obtained on the CRT picture surface.

A more definite explanation will now be given. If the memory device is constructed such as shown in FIG. 5, in order to display the boundary portion between memory section A (hereinafter referred to as the "memory A") 16, as the first memory means storing the left frame, and memory section B (hereinafter referred to as the "memory B") 17, as the second memory means storing the right frame, as a continuous picture image on the CRT, the contents of the latter half of memory A 16 is read and displayed on the former half on the CRT picture surface (the upper half of the CRT picture surface)

while the former half of the memory B17 is read and displayed on the latter half of the CRT picture surface (the lower half of the CRT picture surface).

The relation between the contents of the memory A16 (address allocation) of the memory device and the display position on the CRT surface is such that if it is 64 bytes in the H (horizontal scanning) direction and 1024 lines in the V (vertical scanning direction), the 64 bytes in the H direction are allocated to $A_0$–$A_5$ of memory A while the 1024 lines in the V direction are allocated to $A_6$–$A_{15}$ of memory A16.

For convenience of explanation, the circuit shown in FIG. 5 illustrates only the read circuit portion for the display on the CRT and employs a sequential scanning system for the display.

As a result, the boundary portion between the left and right frames displayed on the CRT picture surface is such that the picture image information on the blackboard such as shown in FIG. 6-I is displayed as the CRT picture surface 13 shown in FIG. 6-II. In this case, the picture image inside the left frame 8 of the picture image on the blackboard 1 is displayed at the upper part of the CRT picture surface 13 such as represented by reference numeral 8' with its direction is turned by 90° while the picture image inside the right frame 9 of the picture image on the blackboard 1 is displayed at the lower part of the CRT picture surface 13 with its direction also turned by 90°.

If a part 8' of the left frame picture image and that 9' of the right frame picture image deviate from each other at their boundary on the CRT picture surface 13, the direction of the ITV indicated by 2' in FIG. 2, for example, is slightly changed and the picture image information is sequentially updated inside the memory B so that the boundary portion is supervised at each time at the boundary portion and the contents of both memories A and B are applied to the hard copy device.

As described in the foregoing, the present invention now makes it possible to provide a picture image information recording apparatus for recording a plane surface picture image having a relatively large area, which apparatus divides the entire picture surface into at least two portions to improve the resolution and to produce the inputs, and which makes it easy to adjust the boundary portion of the divided picture surfaces by use of a CRT display.

What is claimed is:

1. An apparatus for recording picture image information from a large image field comprising:
   a picture image information input device for scanning and reading in succession each of a plurality of frames dividing the large image field;
   a binary coding device for coding the picture image information obtained by said scanning and reading into binary image information;
   a memory device comprising a plurality of memory sections each corresponding to a respective one of said plurality of frames for storing the binary image information corresponding to the respective frames;
   a display device for displaying a picture image from said binary image information;
   a controller device for controlling a display on one portion of said display device of at least part of the binary image information stored in one memory section corresponding to one frame of said image field, and the display on another portion of said display at least part of the binary image information of another memory section corresponding to another frame;
   means for adjusting the displayed portions such that the picture images of the frames are aligned, and means for adjusting the binary image information stored in said memory device to correspond with aligning said frames; and
   a hard copy device for producing a hard copy output of combined frames of the entire image field from the adjusted binary image information in said memory device.

2. The picture image information recording apparatus as defined in claim 1 wherein said picture image input device is a scanning type television camera.

3. The picture image information recording apparatus as defined in claim 1 wherein said monitor device is a CRT display.

4. The picture image information recording apparatus as defined in claim 1 wherein said hard copy device is an electrophotographic copy machine.

5. A picture image information recording method for producing a high resolution, hard copy output from a large image field comprising the steps of:
   dividing the large image field into a plurality of picture frames, and scanning and reading each frame in succession;
   binary coding the picture image information for each frame into binary image information;
   storing the binary image information for the frames in a memory device having a plurality of memory sections corresponding to the frames;
   displaying on one portion of a display device at least part of the binary image information for one frame of the image field, and displaying on another portion of the display device at least a part of the binary image information of another frame;
   adjusting the relative positions of the two displayed portions such that the frames are aligned, and adjusting the binary image information in the memory device in correspondence with alignment of the frames;
   and producing a hard copy output of the combined frames of the entire image field from the adjusted binary image information stored in the memory device.

* * * * *